United States Patent [19]

Tanaka et al.

[11] Patent Number: 4,883,842

[45] Date of Patent: Nov. 28, 1989

[54] RESIN COMPOSITION

[75] Inventors: Shigeo Tanaka; Jiro Sakai; Tomohisa Fukao, all of Ichihara; Kizuku Wakatsuki, Takatsuki; Kazuki Wakamatsu, Ichihara, all of Japan

[73] Assignee: Sumitomo Chemical Company, Limited, Osaka, Japan

[21] Appl. No.: 172,786

[22] Filed: Mar. 28, 1988

[30] Foreign Application Priority Data

Mar. 30, 1987 [JP] Japan ................... 62-79293

[51] Int. Cl.$^4$ ................ C08L 23/24; C08L 23/10; C08L 23/18
[52] U.S. Cl. ......................... 525/240; 525/191
[58] Field of Search ................. 525/240, 191

[56] References Cited

U.S. PATENT DOCUMENTS 3,374,290 3/1968 Franke et al. ............ 525/240

FOREIGN PATENT DOCUMENTS 47-08370 3/1972 Japan .
7408291 12/1974 Netherlands .

*Primary Examiner*—Carman J. Seccuro
*Attorney, Agent, or Firm*—Stevens, Davis, Miller & Mosher

[57] ABSTRACT

There is disclosed resin composition comprising 1 to 99% by weight of a polymer A and 1 to 99% by weight of a polymer B, the polymer A and B having refractive indexes which permit satisfaction of the relation:

$$a \leq 0.015 \text{ and } b - a \geq 0.005$$

wherein a and b are the minimum and the maximum, respectively, of absolute value of the difference between the refractive indexes of the polymers A and B in the temperature range of 20° to 100° C.; said composition being useful as a functional resin for buildings, etc.

5 Claims, No Drawings

RESIN COMPOSITION

FIELD OF THE INVENTION AND RELATED ART STATEMENT

This invention relates to a novel resin composition whose light transmittance changes reversibly with temperature.

There has not yet been known any resin composition whose transparency changes reversibly with temperature

SUMMARY OF THE INVENTION

The present invention is intended to provide a resin composition characterized in that its transparency changes reversibly and markedly with temperature, for instance, a functional resin, e.g., a resin whose light transmittance can be changed with a rise in temperature when the resin is used, for example, in buildings.

The present inventors looked for a composition having the function described above and consequently found that a combination of specific polymers results in excellent performance characteristics, whereby the present invention has been accomplished.

That is to say, the present invention is a resin composition comprising 1 to 99% by weight of a polymer A and 1 to 99% by weight of a polymer B, the polymers A and B having refractive indexes which permit satisfaction of the relation: wherein a is the minimum absolute value of the difference between the refractive indexes of the polymers A and B in the temperature range of 20° to 100° C and b is the maximum absolute value.

In this invention, the polymer A is a polymer whose refractive index is largely dependent on temperature at 20° to 100° C and the polymer B a polymer whose refractive index is only slightly dependent on temperature at 20° to 100° C, and their refractive indexes permit satisfaction of the relation:

$$a \leqq 0.015 \text{ and } b - a \geqq 0.005$$

wherein a and b are the minimum and the maximum, respectively, of absolute value the difference between the refractive indexes of the two polymers.

DETAILED DESCRIPTION OF THE INVENTION

The polymer A used in this invention is preferably a polymer whose refractive index in the temperature range of 20° to 100° C is largely dependent on temperature. It is preferably, for example, a polymer of a straight-chain α-olefin having 14 or more carbon atoms, a copolymer of two or more straight-chain α-olefins having 14 or more carbon atoms, or an alternating copolymer of a straight-chain alkyl methacrylate: having 14 or more carbons and butadiene. Polymers of a straight-chain α-olefin having 14 or more carbon atoms include polytetradecenes-1, polyhexadecenes-1, polyoctadecenes-1, polyeicosene-1, polydocosenes-1, etc.

That is, the polymer A of the present invention can be defined as a polymer comprising a straight-chain α-olefin monomer having 14 or more carbon atoms as a constituent, and whose refractive index at 20° C to 100° C is largely dependent on temperature.

The polymer B used in this invention is preferably a polymer whose refractive index at 20° to 100° C is only slightly dependent on temperature. It is preferably, for example, an α-olefin polymer such as polyethylene, polypropylene, polybutene-1, poly(4-methylpentene-1), or the like; a copolymer of two or more α-olefins; a methacrylic acid ester polymer such as polymethyl methacrylate, polyethyl methacrylate, or the like; a copolymer of the monomer esters thereof; a polyester such as polyethylene terephthalate, polybutylene terephthalate, or the like; or a polyamide such as nylon 6, nylon 66, or the like.

That is, the polymer B of the present invention can be defined as a polymer selected from the group consisting of those listed above and whose refractive indexes at 20° C to 100° C is only slightly dependent upon temperature.

The polymers A and B are not limited to the polymers exemplified above, and any polymers may be used so long as they satisfy the refractive index conditions described above.

When the minimum, a, of absolute value of the difference between the refractive indexes of the polymers A and B is more than 0.015, the maximum of the light transmittance at the temperature at which said absolute value is a, is lowered. Therefore, it is not desirable. The minimum a is more preferably 0.01 or less. When the difference between the minimum absolute value a and the maximum b absolute value of the difference between the refractive indexes of the polymers A and B (b−a) is less than 0.005, the light transmittance changes with temperature only slightly, resulting in a slight change of the transparency with temperature. Therefore, a and b preferably satisfy the formation $b - a \geqq 0.007$, more preferably $b - a \geqq 0.010$, most preferably $b - a \geqq 0.015$.

As the polymers A and B used in this invention, polymers produced by conventional methods may be used. For example, although a polymer preferred as the polymer A, such as a polymer of a straight-chain α-olefin having 14 or more carbon atoms or a copolymer of two or more straight-chain α-olefins having 14 or more carbon atoms can be produced by use of a Ziegler-Natta catalyst, other production methods may be employed so long as a polymer satisfying the conditions of this invention can be obtained. A polymer used as the polymer B, such as an α-olefin polymer or a copolymer of two or more α-olefins can also be produced by a conventional method, for example, the production process disclosed in Japanese Patent Application Kokai (Laid-Open) No. 55-133408.

Although the polymers A and B can be mixed by means of an apparatus used in usual melt mixing, such as screw extruder, heating roll, Banbury mixer, etc., they may be mixed by other conventional methods.

Stabilizers, antistatic agents, lubricants, light-stabilizers, nucleating agents, coloring agents, etc. may be included in the resin composition of this invention, depending on the intended use for the specific resin.

Physical properties were measured by the following methods:

(1) Refractive index

A sample was formed into a sheet of 0.1 mm in thickness at 220° C by means of a compression molding machine, and after conditioning at 23° C for 20 hours, the refractive index was measured by means of an Abbe refractometer Model 2T (mfd. by ATAGO Co., Ltd.).

(2) Intrinsic viscosity [η]

Intrinsic viscosity [η] was measured in tetralin at 135° C by means of an Ubbellohde viscometer.

(3) Light transmittance

A sample was formed into a sheet of 0.5 mm in thickness at 220° C by means of a compression molding machine, and after conditioning at 23° C for 20 hours, the change in the light transmittance with temperature was measured by means of a crystallization rate measuring apparatus Model MK-701 (mfd. by Kotaki Mfg. Co. Ltd.).

(4) Melting point

Measurement was carried out at a heating rate of 5° C/min by means of Model DSC-II (mfd. by The Perkin-Elmer Corp.) and the temperature at the heat absorption peak was defined as the melting point.

This invention is concretely illustrated with the following examples, which should not be construed as limiting the scope of the invention.

EXAMPLES Examples 1 to 6 and Comparative Examples 1 and 2

To 500 ml of dehydrated and purified n-heptane were added 1.5 g of diethylaluminum chloride and 0.126 g of titanium trichloride mfd. by Solvay-Marubeni Chemicals Co. Ltd., in this order, and then the resulting mixed solution was heated to 70° C. Subsequently, 150 ml of octadecene-1 was added and polymerization was carried out for 3 hours. Then, 50 ml of isobutanol was added to the polymerization solution to terminate the polymerization. Next, a large amount of methanol was added to precipitate a polymer, and after filtration, the polymer was dried at 60° C. The polyoctadecene-1 thus obtained weighed 64.2 g, had an intrinsic viscosity $[\eta]$ of 2.8 dl/g as measured in tetralin at 135° C, and had a melting point of 78° C.

Propylene homopolymer (Sumitomo Noblen ®S1010, mfd. by Sumitomo Co. Ltd., MFR at 230° C =1.1) and the polyoctadecene-1 were mixed in each ratio shown in Table 1, followed by melt kneading by means of a heating roll at 190° C. To 100 parts (hereinafter all parts are by weight) of the resin were added as stabilizers 0.05 parts of calcium stearate, 0.2 parts of Sumilizer ®BHT (mfd. by Sumitomo Chemical Co., Ltd.) and 0.1 parts of Irganox ®1010 (Ciba-Geigy Co.). The composition thus obtained was formed into a sheet of 0.5 mm in thickness at 220° C by means of a compression molding machine and then its light transmittance was measured. The results obtained are shown in Table 1. Light transmittance was measured also for each polymer alone, and the results obtained are shown in Comparative Examples in Table 1. The minimum a and the maximum b absolute value of the difference between the refractive indexes of the two polymers were at 23° C (a =0.000) and 100° C (b =0.038), resepctively. As shown in Table 1, the temperature dependence of light transmittance was slight in the case of each polymer alone, but was remarkable in the case of the resin compositions comprising a blend of the polymers having refractive indexes which were such that the minimum and the maximum absolute value of the difference between them satisfied the relation:

$a \leq 0.015$ and $b - a \geq 0.005$.

TABLE 1

Results of Examples 1 to 6 and Comp. Examples 1 to 2

| Example Comparative Example | Polymer A (wt %) | Polymer B (wt %) | Light transmittance at a temperature at which the absolute value was a or b | |
|---|---|---|---|---|
| | | | A: 23° C. | b: 100° C. |
| Example - 1 | 5 | 95 | 64.4 | 28.8 |
| Example - 2 | 10 | 90 | 64.7 | 8.5 |
| Example - 3 | 20 | 80 | 65.5 | 4.0 |
| Example - 4 | 30 | 70 | 73.7 | 5.6 |
| Example - 5 | 70 | 30 | 80.0 | 6.2 |
| Example - 6 | 90 | 10 | 79.4 | 4.6 |
| Comparative Example - 1 | 0 | 100 | 64.2 | 64.0 |
| Comparative Example - 2 | 100 | 0 | 79.2 | 92.0 |

Polymer A: polyoctadecene-1
Polymer B: propylene homopolymer (Sumitomo Noblen ® S101)

Examples 7 to 12 and Comparative Examples 3 to 5

In the same manner as in Examples 1 to 6, there were obtained poly-α-olefins of straight-chain α-olefins having 8, 12, 14, 16, 18, 20 or 22 carbon atoms and a copolymer of an α-olefin having 16 carbon atoms and an α-olefin having 18 carbon atoms (in the ratio of 58/42 by weight). These polymers had intrinsic viscosities $[\eta]$ of 4 5, 4.2, 3.4, 3.6, 2.8, 2.5, 2.4 and 3.1 dl/g, respectively, as measured in tetralin at 135° C. Their melting points are unobserved, at 38°, 58°, 69°, 78°, 83°, 90° and 71° C, respectively. In the same manner as in Examples 1 to 6, 90 parts of polypropylene [Sumitomo Noblen ®S101, mfd. by Sumitomo Chemical Co., Ltd., MRF at 230° C =1.1) and 10 parts of each of the above-mentioned polymers or butyl rubber (Exxon butyl ®365, mfd. by Exxon Chemical Co., Ltd.) were subjected to melt kneading, and the light transmittance of the polymer blends thus obtained was measured. As shown in Table 2, the blends of the polymers having refractive indexes which were such that the minimum a and the maximum b of absolute value between them satisfied the relation:

$a \leq 0.015$ and $b - a \geq 0.005$, had a high light transmittance at a temperature at which the absolute value was a, and their light transmittance was largely dependent on temperature. But as shown in Comparative Examples 3 and 4, in Table 2, the polymer blends in the case where the minimum a was large had a low light transmittance at a temperature at which the absolute value was a. As shown in Comparative Example 5 in Table 2, the polymer blend in the case where b−a is small showed a slight temperature dependence of the light transmittance.

Examples 13 to 15 and Comparative Examples 6 to 8

In the same manner as in Examples 1 to 6, 10 parts of the polymer of straight-chain α-olefin having 18 carbon atoms as obtained in Examples 1 to 6 (the polymer A) and 90 parts of each of the α-olefin polymers or a copolymer of two or more α-olefins (the polymer B) described hereinafter were subjected to melt kneading, and the light transmittance of the polymer blends thus obtained was measured. Light transmittance was measured also for each hereinafter described α-olefin polymer alone or the copolymer of two or more α-olefins alone, and the results obtained are shown in Comparative Examples 6 to 8 in Table 3. In Example 13 and Comparative Example 8, the melt kneading and sheet formation were conducted at 300° C.

As shown in Table 3, the temperature dependence of light transmittance was slight in the case of each polymer alone, but was remarkable in the case of Examples 13 to 15, i.e., blends of the polymers having refractive indexes which were such that the minimum and the maximum absolute value of the difference between the refractive indexes of the polymers A and B in the temperature range of 20° to 100° C) changes in transparency with temperature markedly and reversibly, and hence can achieve the object of the present invention.

TABLE 2

Results of Examples 7 to 12 and Comparative Examples 3 to 5

| Example or Comparative Example | The number of carbon atoms of polymer A | Light transmittance at a temperature at which the absolute value was a or b | | | | | |
|---|---|---|---|---|---|---|---|
| | | Temp. at which the absolute value was a | a | Trans-mittance | Temp. at which the absolute value was b | b − a | Trans-mittance |
| Example - 7 | 14 | 20° C. | 0.011 | 49.8 | 100° C. | 0.030 | 6.8 |
| Example - 8 | 16 | 20 | 0.005 | 61.9 | 100 | 0.035 | 8.2 |
| Example - 9 | 18 | 23 | 0.000 | 64.8 | 100 | 0.039 | 9.0 |
| Example - 10 | 20 | 35 | 0.000 | 62.4 | 100 | 0.041 | 8.3 |
| Example - 11 | 22 | 44 | 0.000 | 57.6 | 100 | 0.039 | 9.3 |
| Example - 12 | 16/18 | 20 | 0.006 | 61.3 | 100 | 0.032 | 8.1 |
| Comparative Example - 3 | 8 | 20 | 0.032 | 8.0 | 100 | 0.009 | 3.9 |
| Comparative Example - 4 | 12 | 20 | 0.021 | 18.2 | 100 | 0.021 | 4.9 |
| Comparative Example - 5 | Butyl rubber | 100 | 0.003 | 63.7 | 20 | 0.004 | 59.7 |

Polymer B: propylene homopolymer (Sumitomo Noblen ® S101)
Mixing ratio of polymer A to polymer B = 1/9

TABLE 3

Results of Examples 13 to 15 and Comp. Examples 6 to 8

| Example or Comparative Example | Polymer B | Light transmittance at a temperature at which the absolute value was a or b | | | | | |
|---|---|---|---|---|---|---|---|
| | | Temp. | a | Trans-mittance | Temp. | b − a | Trans-mittance |
| Example - 13 | Ethylene-propylene copolymer | 38° C. | 0.000 | 87.2 | 100° C. | 0.025 | 38.5 |
| Example - 14 | Butene-1-ethylene copolymer | 20 | 0.002 | 91.0 | 80 | 0.014 | 38.2 |
| Example - 15 | 4-Methyl-pentene-1 polymer | 80 | 0.000 | 90.5 | 20 | 0.040 | 2.5 |
| Comparative Example - 6 | Ethylene-propylene copolymer | 38 | — | 84.9 | 100 | — | 84.8 |
| Comparative Example - 7 | Butene-1-ethylene copolymer | 20 | — | 94.4 | 80 | — | 91.8 |
| Comparative Example - 8 | 4-Methyl-pentene-1 polymer | 80 | — | 93.5 | 20 | — | 96.0 |

Polymer A: polyoctadecene-1 (obtained in Examples 1 to 6)
Mixing ratio of polymer A to polymer B = 1/9 refractive indexes satisfied the relation specified in the present specification.

Characteristics of the α-olefin polymers used here are as follows:
Ethylene-propylene copolymer (Sumitomo Noblen ®S131, mfd. by Sumitomo Chemical Co. Ltd.): MFR at 230° C = 1.1, density = 0.895 g/cm$^3$
Butene-1-ethylene copolymer (prepared with a Ziegler-Natta catalyst system): MFR at 190° C = 1.1, density = 0.901 g/cm$^3$
4-Methylpentene-1 polymer (TPX ®RT-18, mfd. by Mitsui Petrochemical Industries Ltd.): MFR at 260° C = 26, density = 0.833 g/cm$^3$ As described above, a resin composition comprising polymers A and B having refractive indexes which permit satisfaction of the relation:

$$a \leq 0.015 \text{ and } b - a \geq 0.005$$

(wherein a and b are the minimum and the maximum, respectively, absolute value of the difference between the refractive indexes of the polymers A and B in the temperature range of 20° to 100° C) changes in transparency with temperature markedly and reversibly, and hence can achieve the object of the present invention.

Example 16 and Comparative Example 9

In the same manner as in Examples 1 to 6, 10 parts of the polymer of straight chain α-olefin having 18 carbon atoms as obtained in Examples 1 to 6 (the polymer A) and 90 parts of each of a polymethylmethacrylate (Sumipex ®MHO mfd. by Sumitomo Chemical Co., Ltd.; the polymer B) were subjected to melt kneading.

The minimum absolute value of the difference "a" between the refractive indexes of the polymers A and B was 0.001 at 20° C and the maximum absolute value of the difference "b" was observed at 100° C and the difference "b−a" was 0.034. The respective light transmittance values of the mixture of the polymers A and B at the respective temperatures mentioned above were 86.0% and 56.8%.

The light transmittance values of composition containing only polymethylmethyacrylate (Comparative Example 9) at temperatures of 20° C and 100° C were 98.1 and 95.5%, respectively.

What is claimed is:

1. A resin composition, the transparency of which changes reversibly with temperature, comprising
   1 to 99% by weight of a polymer A which has a refractive index largely dependent on temperature and is a polymer of a straight-chain α-olefin having 14 or more carbon atoms or a copolymer of two or more straight-chain α-olefins having 14 or more carbon atoms and
   1 to 99% by weight of a polymer B which has a refractive index slightly dependent on temperature and is a polymer of an α-olefin having 3–6 carbon atoms, a copolymer of two or more α-olefins or a methacrylic acid ester polymer,
   the polymers A and B having refractive indexes which permit satisfaction of the relation:

$a \leqq 0.015$ and $b - a \geqq 0.005$ wherein a and b are the minimum absolute value and the maximum absolute value, respectively, of the difference between the refractive indexes of the polymers A and B in a temperature range of 20° C to 100° C.

2. A resin composition according to claim 1, wherein $b - a \geqq 0.015$.

3. A resin composition according to claim 1, wherein the polymer of a straight-chain α-olefin having 14 or more carbon atoms is one selected from the group consisting of polytetradecene-1, polyhexadecene-1, polyoctadecene-1, polyeicosene-1 and polydocosene-1.

4. A resin composition according to claim 1, wherein the polymer of an α-olefin having 3–6 carbon atoms or the copolymer of two or more α-olefins is a polymer selected from the group consisting of polypropylene, polybutene-1, poly(4-methylpentene-1) and a copolymer of two or more α-olefins selected from the group consisting of ethylene, propylene, butene-1 and 4-methylpentene-1.

5. A resin composition according to claim 1, wherein the methacrylic acid ester polymer is a polymethyl methacrylate.

* * * * *